United States Patent
Ward et al.

(10) Patent No.: US 7,295,101 B2
(45) Date of Patent: Nov. 13, 2007

(54) USER INTERFACE SYSTEMS

(75) Inventors: Andrew Martin Robert Ward, Cambridge (GB); Stephen Edward Hodges, Cambridge (GB); Peter Joseph Steggles, Cambridge (GB)

(73) Assignee: AT&T Corp., New York, NY (US)

( * ) Notice: Subject to any disclaimer, the term of this patent is extended or adjusted under 35 U.S.C. 154(b) by 234 days.

(21) Appl. No.: 10/478,061

(22) PCT Filed: May 2, 2002
(Under 37 CFR 1.47)

(86) PCT No.: PCT/GB02/02013

§ 371 (c)(1),
(2), (4) Date: Aug. 9, 2004

(87) PCT Pub. No.: WO02/097600

PCT Pub. Date: Dec. 5, 2002

(65) Prior Publication Data

US 2005/0010750 A1    Jan. 13, 2005

(30) Foreign Application Priority Data

May 25, 2001   (GB) ................................ 0112717.4

(51) Int. Cl.
*H04Q 5/22*   (2006.01)
(52) U.S. Cl. ........................ 340/10.1; 710/15
(58) Field of Classification Search ............... 340/10.1, 340/10.31, 10.32, 10.33, 10.5, 10.52
See application file for complete search history.

(56) References Cited

U.S. PATENT DOCUMENTS 5,382,784 A  * 1/1995 Eberhardt .............. 235/462.46
5,629,981 A  * 5/1997 Nerlikar .................. 340/10.31
5,684,828 A    11/1997 Dias et al.

(Continued)

FOREIGN PATENT DOCUMENTS

EP    0 986 020 A    3/2000

(Continued)

OTHER PUBLICATIONS

Kindberg T et al: "People, Places, Things: Web Presence for the Real World" Proceedings Third IEEE Workshop on Mobile Computing Systems and Applications, Los Alamitos, CA, USA Dec. 7-8, 2000 p. 19-28 (Dec. 7, 2000).

(Continued)

*Primary Examiner*—Jeffery Hofsass
*Assistant Examiner*—Scott Au

(57) ABSTRACT

A user interface system for allowing users to initiate events comprises: a plurality of markers each having a marker identity; a plurality of portable readers each having a reader identity and arranged to read said marker identities from adjacent markers, and at least one base station arranged to communicate with said readers in a wireless manner, wherein at least one reader is provided with actuation means which when actuated by a user causes the reader identity of the reader and the marker identity of an adjacent marker to be transmitted by the reader to said base station, so as to cause, for at least one of said markers, said base station to initiate, directly or indirectly, an action which is at least partly determined by the reader identity of said reader.

25 Claims, 1 Drawing Sheet

U.S. PATENT DOCUMENTS

| | | | |
|---|---|---|---|
| 6,008,727 A * | 12/1999 | Want et al. | 340/10.42 |
| 6,119,944 A | 9/2000 | Barkan et al. | |
| 6,167,464 A * | 12/2000 | Kretschmann | 710/15 |
| 6,318,636 B1 * | 11/2001 | Reynolds et al. | 235/472.01 |
| 6,379,058 B1 * | 4/2002 | Petteruti et al. | 400/76 |
| 6,446,208 B1 * | 9/2002 | Gujar et al. | 713/185 |
| 6,853,294 B1 * | 2/2005 | Ramamurthy et al. | 340/10.1 |
| 2002/0044058 A1 * | 4/2002 | Heinrich et al. | 340/572.1 |

FOREIGN PATENT DOCUMENTS

| | | |
|---|---|---|
| GB | 2 356 953 A | 6/2001 |
| GB | 2 358 266 A | 7/2001 |
| WO | WO 91/17514 A1 | 11/1991 |

OTHER PUBLICATIONS

Rekimoto, Ayatsuka: "Cybercode: Designing Augmented Reality Environments with Visual Tags" Proceedings of Dare 2000 on Designing Augmented Reality Environments, Elsinore, Denmark p. 1-11 (2000).

Rekimoto J et al: The World Through the Computer: Computer Augmented Interaction with Real World Environments: UIST '95 8th Annual Symposium on User Interface Software and Technology. Pittsburgh, PA Nov. 14-17, 1995, ACM Symposium on User Interface Software and Technology, NY (Nov. 14, 1995).

* cited by examiner

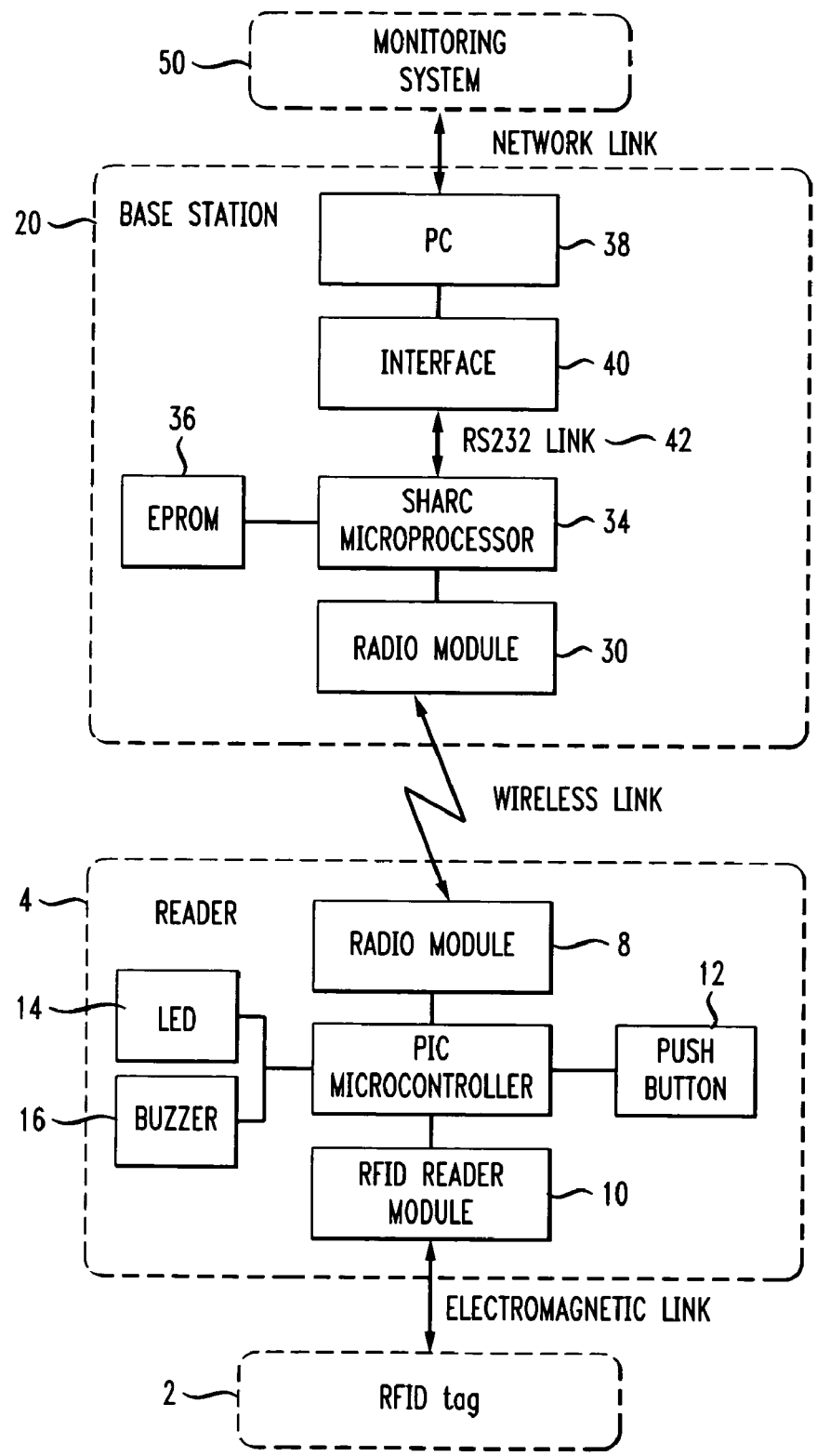

USER INTERFACE SYSTEMS

This application claims the benefit of International Patent Application Number PCT/GB02/02013, filed May 2, 2002, which claims priority to Great Britain Patent Application No. 0112717.4, filed May 25, 2001.

The invention relates to user interface systems for allowing users to initiate events.

European Patent Application No. 01200786.0 in the name of the applicant describes a system of so-called 'virtual' buttons. These are paper labels placed at known, surveyed points throughout a building. When a 3D tracking device called a "Bat" is placed over a paper label, and a button on the Bat is pressed, a system monitoring both the positions of Bats and the status of the buttons on them detects that a user wishes to perform some action, namely the action that is detailed on the paper label. The system also knows the surveyed positions of the virtual buttons, and what action is to be performed when each one is activated. For example, a paper label on a wall saying 'Toggle light' might be 'pressed' to switch the lights in the room on or off.

Virtual buttons have proved to be a novel and interesting way to interact with computer systems. However, they highlight an interesting set of trade-offs that will be encountered whenever such systems are implemented. In the current virtual button scheme, the 'buttons' are nothing more than a point in 3D space, with a label placed at that point. The label itself need be no more complex than a paper note with the description of some action written upon it. To support these buttons, however, a complex 3D tracking system must be installed in the building containing them. The tracking system enables the positions of Bats to be determined at all times, to establish whether they are interacting with the virtual buttons or not.

Some further known arrangements will first be discussed.

Dallas Semiconductor of 4401 South Beltwood Parkway, Dallas, Tex. 75244 USA manufactures a ring, known as a "Java ring", and further described at the website "www.ibutton.com", that contains (amongst other things) a unique ID. It is possible to use this ring to identify a user by placing the ring into a holder, which then reads the ID. The manufacturers have envisaged office-based applications of this technology in which every computer in a building would have its own reader and, when a user was detected at a machine, that computer would personalise itself to the user. However, Java ring readers do not contain a unique ID, so readers are linked with machines only by virtue of the fact that they are plugged into one another. Furthermore, Java ring readers require a constant power supply.

A white paper entitled "People, Places, Things: Web Presence for the Real World", available from the Hewlett Packard website address www.cooltown.hp.com, describes a "CoolTown" project, in which objects and places are labelled with beacons or bar codes that can be decoded by a Personal Digital Assistant (PDA). The PDA translates the unique bar or beacon code into a web address, which can then be contacted to find out more information about the object or place. The device used to decode the labels and display the associated web page comprises not only a reader, but also a display.

Jun Rekimoto and Katashi Nagao, "The World through the Computer: Computer Augmented Interaction with Real World Environments", User Interface Software and Technology (UIST '95), pp. 29-36, 1995, describes the Sony NaviCam system which uses cameras that recognise 2D bar codes to perform augmented reality work and file retrieval. In the NaviCam project, a portable computer with an attached camera recognises bar codes placed on objects throughout the environment, and uses these codes to fetch information about the objects across a wireless link. This information is then superimposed on the camera's view of the scene, and is presented to the user, enabling them to see an augmented view of the world.

Jun Rekimoto and Yuji Ayatsuka, "CyberCode: Designing Augmented Reality Environments with Visual Tags", Designing Augmented Reality Environments (DARE 2000), 2000 describes the Sony CyberCode project, in which paper documents are generated using a computer and labelled with a 2D bar code. Later, when a user shows a paper document to the computer (which, again, has an attached camera), the computer uses the bar code to automatically retrieve the electronic version of the document for editing or review.

Digital Convergence, Inc., of 9101 N Central Expy. 6th Floor, Dallas, Tex. 75231-5914 supplies a CueCat system, in which a bar code reader plugs into a PC. Each bar code reader has a unique ID, so when a bar code is scanned, an event consisting of a bar code ID and reader ID is generated, and may be used to fetch a web page to the PC, or sent to a monitoring system for compilation of statistics on which bar codes are scanned most often by particular users.

EP O,986,020 describes a system in which one or more tag readers are added to a portable computer. The portable computer is provided with a screen, and is arranged to display documents and perform other tasks when tags are brought near to the tag readers. The portable computer is therefore required to be a reasonably complex and bulky device, and is required to provide a constant power supply to the readers. Furthermore, in order to identify different users of the system, it is necessary to provide each user with an identification tag.

The invention seeks to overcome at least some of the disadvantages of the prior art.

According to the invention there is provided a user interface system for allowing users to initiate events, the system comprising:
  a plurality of markers each having a marker identity;
  a plurality of portable readers each having a reader identity and arranged to read said marker identities from adjacent markers, and
  at least one base station arranged to communicate with said readers in a wireless manner,
  wherein at least one reader is provided with actuation means which when actuated by a user causes the reader identity of the reader and the marker identity of an adjacent marker to be transmitted by the reader to said base station, so as to cause, for at least one of said markers, said base station to initiate, directly or indirectly, an action which is at least partly determined by the reader identity of said reader.

It will be appreciated that when the marker and reader identities are trasmitted to the base station, there are a number of possible actions which can be initiated depending on which particular reader identity is involved. In this way, the system has the advantage of allowing services to be customised to particular users on the basis of the reader identities.

Further preferred features of the invention are set out in the accompanying dependent claims.

BRIEF DESCRIPTION OF THE DRAWING

FIG. 1 shows an embodiments of the invention will now be more particularly described, by way of example only, with reference to the accompanying FIGURE, which shows a schematic overview of an embodiment of the invention. The same FIGURE will be used for each of the embodiments described below.

In a first embodiment, virtual buttons 2 consist of a paper label on which a description of an operation is printed, and behind which a small radio frequency identification (RFID) tag (not shown) is affixed. The preferred type of RFID tag is a 20 mm 'Unique' tag manufactured by Sokymat SA of Zone Industrielle CH 1614 Granges (Veveyse) Switzerland.

A button reader device 4 is provided, which comprises a PCB on which is mounted a PIC microcontroller 6 manufactured by Microchip Inc. of 2355 West Chandler Blvd. Chandler, Ariz., USA 85224-6199, a 418 MHz BiM radio module 8 manufactured by Radiometrix Ltd. of Hartcan House, Gibbs Couch, Carpenders Park, Hertfordshire WD1 5EZ England, a Micro RWD RFID reader module 10 manufactured by IB Technology Ltd. of Burnthome House, Burnthome Lane, Dunley, Worcestershire DY13 0TS England, a push button 12, an LED 14, a piezoceramic buzzer 16, and 4 MHz and 32 kHz processor clocks (not shown). Two 3V lithium coin cells (not shown) supply power, and a 418 MHz helical antenna (not shown) is connected to the RF input/output pin of the radio module 8. A unique 48-bit ID is programmed into the memory of the PIC microcontroller 6 on each button reader 4. It will be appreciated that, in this embodiment, the reader 4 is a relatively simple device, which is provided without any screen, and can therefore be made relatively small and compact, perhaps having a maximum dimension of 4, 6 or 8 cm, or less. The absence of a screen also contributes to the low power properties of the reader 4.

When a user wants to activate a virtual button 2, they move the button reader 4 in front of the virtual button 2, and press the push button 12 on the button reader 4. The PIC microcontroller 6 normally operates in a SLEEP state, drawing little current. However, when the push button 12 is pressed, the PIC microcontroller 6 awakes from SLEEP mode, and activates the RFID reader module 10. If the RFID reader module 10 indicates that it has successfully detected the 40-bit identifier of the RFID tag associated with the virtual button 2, the PIC 6 attempts to send an information packet to nearby base stations 20. Otherwise, the PIC 6 returns to SLEEP mode until the push button 12 is pressed again.

To send information to nearby base stations 20, the PIC 6 turns off the RFID reader module 10, and turns on the radio module 8 in transit mode. The PIC 6 constructs a data message consisting of a 40-bit preamble, and a 208-bit data segment. The data segment consists of the 40-bit tag ID, the 48-bit button reader ID, an 8-bit sequence number that is incremented after each transmission event, and an 8-bit checksum, all encoded using Manchester encoding. Messages are transmitted at 38.461 kbaud.

Once the PIC 6 has transmitted the message, it switches the radio module 8 to receive mode, and waits for responses from nearby base stations 20. Response messages have a baud rate of 38.461 kbaud, and consist of a 40-bit preamble (which differs from the transmitted message preamble, so as not to confuse base stations 20 and buttons readers 4), and a 144-bit data segment. The data segment consists of a 48-bit button reader ID, an 8-bit sequence number, an 8-bit command value and an 8-bit checksum, all encoded using Manchester encoding. A button reader 4 considers the incoming message to be a valid response if the 48-bit button reader ID in the message matches its own, the 8-bit sequence number matches that transmitted in the outgoing message, and the 8-bit checksum is correct.

If the PIC 6 detects a valid response, the 8-bit command word is examined to determine the correct course of action in informing the user of this fact Different command words can generate different types of feedback via the LED 14 and piezoceramic buzzer 16.

For example, the LED 14 may blink and/or beeps and tunes can be played using the buzzer 16. If a valid response has not been received within 150 ms, the PIC 6 assumes that no base station 20 has picked up its transmitted message, and switches the radio module 8 off, before returning to SLEEP mode.

The reader 4 only remains connected (in a networking sense) to the base station 20, and hence to any computing system or monitoring system connected to the base station 20, until the reader 4 receives a valid response, at which point the reader 4 returns to a low power mode in which the radio module 8 is switched off.

In this embodiment, the reader module 10 is provided with a miniaturised reader antenna coil (not shown) in the form of an off-the-shelf wound inductor. This provides the benefit of a smaller physical antenna size (8 mm×3 mm×3 mm) and a benefit (for the present system) of a reduced reading range. The range of the reader 4 is arranged to be the same as or smaller than the size of the tag (perhaps a centimeter or so). So, if several tags are placed on an object such that they do not physically overlap, it is certain that they can be individually activated without interfering with each other. The inductor used as the antenna coil is a B78108-S1684-J, made by EPCOS AG of Strasse "In den Seewiesen", D-89520 Heidenheim, Germany.

Base stations 20 consist of a PCB, on which is mounted a 418 MHz BiM radio module 30, a SHARC microprocessor 32 manufactured by Analog Devices of One Tecnology Way, P.O Box 9106, Norwood, Mass., USA 02062-9106, an RS232 serial interface 34 and an EPROM 36 to supply the SHARC 32 with its program, and an IBM-compatible PC 38 running the Linux operating system which is connected to the Internet The PCB is connected to the RS232 interface 40 of the PC 38.

Normally, the SHARC microprocessor 32 monitors the digital output of the radio module, which is set to receive mode. If an incoming message (with the format described above) from a button reader 4 is detected, and the checksum of the message is correct, the SHARC 32 sends a message containing the tag ID, button reader ID and sequence number to the PC 38 across an RS232 link 42. A program running on the PC 38 forwards this message, and a timestamp, to a Monitoring System 50 (which is a software object running somewhere on the Internet) across a Common Object Broker Request Architecture (CORBA) interface. The SHARC 32 also starts an internal software timer at the time when the incoming radio message preamble is detected.

The response of the Monitoring System 50 (also delivered across the CORBA interface) consists of an 8-bit command, and a time value. The program running on the PC 38 passes these values across the RS232 link 42 to the SHARC 32. The SHARC 32 compares the time value with the software timer that has been running since the detection of the incoming radio message preamble. If the time value is greater than the software timer value, the SHARC 32 waits until the software timer value is equal to the time value, then switches the radio module 30 to transmit mode, and transmits an outgoing (response) radio message with the format described previously. Once the response message has been sent, or if the SHARC 32 has already missed its opportunity to send a reply (as implied by the time value), the radio module 30 is switched back into receive mode, and the SHARC 32 begins watching for another incoming radio message.

The Monitoring System 50 is a CORBA object running on a machine connected to the Internet. The object has two CORBA interfaces—an interface that lets Base Stations 20 inform the monitoring service that a button read event has occurred (and lets the Monitoring System 50 return command information), and an interface that lets users change the mappings between virtual buttons 2 and services for different button readers 4.

The Monitoring System 50 stores two tables of information. The first records which Base Stations 20 have sent information about virtual button read events to the Monitoring System 50 in the recent past. The second records the actions to be taken when a particular virtual button 2 is activated using a particular button reader 4.

When the Monitoring System 50 receives a virtual button read event from a button reader 4 via a Base Station 20, it checks the sequence number in the incoming message against the sequence number of the last message associated with that button reader 4. If the numbers differ, the events refer to different activation attempts, and if the timestamp of the incoming event is earlier than that of the last stored event for that reader 4, the Monitoring System 50 can conclude that the incoming message refers to an out-of-date event and there is no point in responding to it, because the user has already moved on to attempt another button press (perhaps for the same virtual button 2). In this case, the Monitoring System 50 does not send a response to the Base Station 20.

If the sequence numbers are not the same, and the incoming timestamp is the most recent, the incoming timestamp and sequence numbers are stored by the Monitoring System 50, which concludes that the message refers to a new virtual button press event for the button reader 4 referred to in the message. The Monitoring System 50 looks up the correct action to take when the virtual button 2 referred to in the message is activated by that reader 4 (using the unique IDs stored in the message), and activates that service. In a preferred embodiment, references to services are stored as text strings indicating how to contact that service over the Internet (possibly using a CORBA interface), and what command should be activated for that particular combination of virtual button 2 and button reader 4. The Monitoring System 50 may receive a response from the service over the Internet, and the Monitoring System 50 maps this response into one of the valid feedback commands recognised by the button reader 4, using a simple table stored with the service reference. Again, in the preferred embodiment, this table is stored as a simple text string.

The Monitoring System 50 sends any response from the service, together with the button reader ID and sequence number back to the Base Station 20 that sent the incoming event message, over the CORBA interface. It also allocates a time at which the Base Station 20 should respond to the button reader 4, and sends that to the Base Station 20. This time is sent as the interval between the time of detection of the end-of-preamble marker found by the Base Station 20, and the time at which transmission of the response message should begin.

If the sequence numbers for incoming messages received by two base stations 20 are the same and the timestamps are similar (to within a few tens of milliseconds, to account for drift between the clocks of the Base Stations 20), the Monitoring System 50 can conclude that the incoming message refers to the most recent virtual button press event for that button reader 4. The Monitoring System 50 does not attempt to activate the relevant service again, but instead just sends the response indication (determined as above) back to the Base Station 20. The Monitoring System 50 attempts to allocate a different response transmission time to every Base Station 20 that picks up a valid signal from a particular button reader 4, so that the response transmissions from the Base Stations 20 do not collide. It takes approximately 5 ms to transmit the response message from the Base Station 20 to the button reader 4, so it can be seen that the Monitoring System 50 must try to arrange that transmission times be separated by at least 5 ms. If more Base Stations 20 report button read events than there are available transmission times (approximately 50-150 ms of listening time at the button reader divided by 5 ms of transmission time at the Base Station 20), then the Monitoring System 50 simply sends an impossible transmission time (i.e. before the detection of the end-of-preamble marker) back to the excess Base Stations 20. Those Base Stations 20 will ignore this response.

It should be appreciated that the Monitoring System 50 is capable of sending back to the reader 4, via base station 20, not only a confirmation that an incoming message from the reader 4 has been successfully received, but also information relating to the corresponding service or action, including for example whether a service or action has been successfully initiated by the Monitoring System 50. This information can then be provided to the user by the reader 4.

The sequence of operations carried out in the first embodiment can be summarised as follows:

1 The user presses a (real) button 12 on the button reader 4, waking it from a low-power sleep state.
2 The button reader 4 attempts to determine the ID of any nearby virtual button 2.
3 If the button reader detects a virtual button 2, it sends the ID of the virtual button 2 and its own ID to a nearby base station 20, across a wireless link.
4 The base station 20 forwards the virtual button ID and the button reader ID to the monitoring system 50 over a wired link, timestamping this data is necessary.
5 Based on its knowledge of virtual buttons 2, their IDs, and the actions associated with them, the monitoring system 50 initiates the action associated with the activated virtual button 2, personalised, if necessary, to the user who activated the virtual button 2 (based on the ID of the button reader 4). If appropriate, the monitoring system 50 may receive details of the results of that action.
6 If appropriate, the monitoring system 50 sends reply information to the button reader 4 via the base station 20 that detected the button event
7 The base station 20 forwards any reply information to the button reader 4 over the wireless link.
8 If appropriate, the button reader 4 presents any reply information to the user, via a suitable output interface (e.g. buzzer, display, vibration alert, etc.).

In a second embodiment, if a button reader 4 transmits a message to nearby base stations 20 but receives no response, the reader 4 retransmits the same message again after a short interval of time. The message contains the same sequence number, and so does not cause the Monitoring System 50 to activate the associated service again. Schemes involving more than one retry attempt are also within the scope of the invention.

In the embodiments described above activating a virtual button 2 using a button reader 4 caused a Monitoring Service 50 to perform a particular task associated with that virtual button 2, customised to the particular button reader 4. The invention includes systems that go beyond this simple 'click to activate' model, as described below. The same reference numerals as above are used for convenience.

In a third embodiment, if a user wants to cause two or more pieces of equipment to operate together, possibly personalised to the user, is possible to click on a first virtual button on one piece of equipment using the button reader 4, then on a second virtual button on the other piece of equipment, and have the Monitoring System 50 use the knowledge that virtual buttons on both devices have been read by the same button reader 4 in a short space of time to associate the two devices, and cause a link to be created between them (optionally personalised to the owner of the button reader 4).

For example, the output from a wireless camera (not shown) could be connected to several screens (not shown), simply by first clicking on the camera, and then on the screens, with a button reader.

Both the camera and screens would have virtual button tags 2 placed on them. To implement such a scheme, the monitoring system 50 stores a history of which buttons 2 had recently been activated by a particular reader 4, a type value for each button 2 in the environment, and a set of services that would be activated when a group of buttons 2 of particular types were activated in close succession by the same reader 4.

In a fourth embodiment the monitoring system 50 stores information that controls whether or not a reader 4 can activate a particular button 2, based on the pattern of button activations which have previously been performed. An example is a button 2 representing a token that could only be held by one person at a time, for example to indicate temporary 'ownership' of a meeting room. The monitoring system 50 stores information indicating the circumstances under which a particular button 2 can be activated, and information describing the current state of the button 2, and uses the two to determine whether or not subsequent activation is possible. In the example given, after an initial activation of the meeting room button, the monitoring system does not permit subsequent activations to succeed until the owner of the 'token' relinquishes it, possibly by activating the same button 2 once more.

In a fifth embodiment, a user moves their personal desktop to a screen (not shown) by 'clicking' on an RF tag attached to the screen, using their RF tag reader. The system stores a function from TAG_ID->SCREEN_ID, and function from READER_ID->PERSON_ID, and PERSON_ID->DESKTOP_ID. So the (TAG_ID, READER_ID) association can be used to generate a (SCREEN_ID, DESKTOP_ID) association. Using this association, the system then performs the action of moving the user's desktop to the appropriate screen. A further click on the RF tag removes the desktop from the screen.

In a sixth embodiment, a poster (not shown) controls a service (such as a phone-call redirecting service) in an office building. A central computer holds the state of the service for each user. When a user clicks on an RFID tag placed behind a point market on the poster as the 'toggle' button, the central computer toggles the activation state of the service for that user, based on the (TAG_ID, READER_ID) association.

In a seventh embodiment, a poster controls a networked scanner (not shown). A user places a document to be scanned into the scanner, and starts the scan by clicking on a poster (which contains an RFID tag) next to the scanner. The monitoring service notes the (TAG_ID, READER_ID) association, and activates the scanning procedure. When the scan is complete, the digital data of the scanned document is sent to an appropriate storage location (e.g. the user's e-mail folder) parameterised by the identity of the user.

In an eighth embodiment, a doctor in a hospital may carry a digital audio memo taker (not shown) that records time-stamped audio files. He can record notes for each patient To ensure that the right notes are associated with the right patient, he clicks on an RFID tag attached to a wristband on each patient. The monitoring service records the (TAG_ID, READER_ID) associations thus generated, and the times at which they were generated, and so when the audio memo device is synchronised with the network, the system knows which patient each audio note is associated with. A more sophisticated system includes several audio memo recorders that are left around the hospital and which can be used by any doctor. When a doctor picks up a memo recorder, he personalises it to himself by clicking on an RFID tag attached to the recorder.

Subsequent 'clicks' that are generated using that doctor's RFID reader are then associated with the audio files recorded by the memo taker he is holding.

In a ninth embodiment, a camera (not shown) in a meeting room is placed on a motorised movable mounting, and is positioned so that it can view any point around a boardroom table. Several RFID tags are placed at known locations on the table, and in a videophone conversation, a speaker can ensure that they are in the field of view of the camera by clicking on the RFID tag nearest them. The system slews the camera round to view that point in space. Of course, the system now knows who is in the field of view of the camera, and this can be displayed (textually) at the far end of the videophone conversation to aid communication between the parties when large groups are involved. In its broadest sense, this application demonstrates the act of "tagging" a location. If someone clicks on a tag and we know where the tag is, we then know where the person is.

This embodiment can also be used to illustrate the idea of 'teaching' the system what a particular tag is to be used for. Suppose we want to add another camera point around the table. We manually point the camera in the right direction (and the computer system records that configuration of the movable mounting), and we place a fresh tag, not known to the system, in the centre of the field-of-view. Then, using anyone's tag reader, we click on the tag. This generates a (TAG_ID, READER_ID) association, but the system will not know what that particular tag does, because it has not seen the tag before. Therefore, the user then clicks on another tag which is already known to the system and which performs the camera-slewing action. This generates another (TAG_ID, READER_ID) association, and since the system knows the action performed by the second tag, it infers that the first tag should perform the same action, but should move the camera to the new (manually-configured) position.

Variants of all of the above embodiments are possible in which at least some of the messages between the button reader 4 and base stations 20 are encrypted.

In one variant a public-key encryption system is used. The monitoring system 50 has an encryption key consisting of a private section and a public section. The private section is known only to the monitoring system 50, whilst the public section can be safely distributed. Similarly, each button reader 4 has a private key, held by itself, and a public key that was distributed possibly by means of a public-key-server located on the Internet, in known manner.

Periodically, the button reader 4 contacts a base station 20 in its vicinity to determine the public key of the local monitoring system 50. This ensures that the button reader 4 always holds the public key of the local monitoring service system 50 if readers 4 are moved between domains of different monitoring systems 50. It would, of course, be possible to give all the monitoring systems 50 the same encryption key, and this stage would not then be necessary, but the previously-described scheme is more flexible.

When a button reader 4 transmits data to base stations 20, the message data is encrypted using the local monitoring system's public key. After base stations 20 have passed the incoming message to the monitoring system 50, it uses its knowledge of the private segment of the key to decode the reader ID and the tag ID, and activates the appropriate service. An eavesdropper (who does not know the private segment of the key) is unable to determine which reader 4 has read which tag.

The monitoring system 50 must then send feedback to the reader 4 via the base stations 20. To do this, it obtains the reader's public key (using the reader ID in the incoming message), and then encrypts the outgoing (feedback) message using that key. When the message is transmitted over the radio interface, only the button reader 4 (which has sole knowledge of the private segment of its encryption key) will be able to determine that the feedback message is for it, and what the message contains.

Care must be taken in such a system to prevent traffic-analysis attacks when the monitoring system 50 looks up a button reader's public key based on its ID (taking a long-term cache of recently-seen readers 4, with additional spoof lookups, would frustrate such attacks), and, of course, it might be possible for an attacker to watch to see which services were activated for which users to determine what button 2 had just been pressed, and by whom. However, encryption offers protection against attackers who only have access to information obtained from interception of the radio channel.

The variant just described is vulnerable to so-called 'replay attacks' (this is a term used throughout the security literature). Even though an attacker could not determine which button 2 has been pressed by which reader 4, if the above enhancement has been implemented, they could simply record a message transmitted over the radio interface from a button reader 4 to a base station 20, and replay that message some time later. This would have the effect of spoofing the monitoring system into thinking that the same button reader 4 had pressed the same button 2 again, and might be a problem if, for example, the virtual button 2 in question performed some financial transaction. Similarly (but with more difficulty, because of the requirement of matching sequence numbers), an attacker might be able to replay a feedback reply from the monitoring system 50 to the button reader 4, to suggest that a message had got through to the system when, in fact, it had not.

Several methods are available to foil such replay attacks on the system. If the button readers 4 and the monitoring system 50 both have an accurate real-time clock, the clock value can be encoded in the messages to and from the monitoring system 50 in order to assure both the monitoring system 50 and the button reader 4 that the messages are fresh. Alternatively, the protocol between the button reader 4 and the monitoring system 50 could be slightly extended. In this case, when the button reader 4 is activated, and has successfully read the tag ID on the virtual button 2 being activated, it transmits a message containing only the ID of the button reader 4 and a large random number, encoded using the public key of the monitoring system 50. This is passed to the monitoring system 50 via the base stations 20, and the monitoring system 50 then chooses its own large random number, which is encoded, together with the button reader's ID and random number, using the public key of the button reader 4, and which is then returned to the button reader 4 via the base stations 20.

Upon receipt of the message, the button reader 4 knows (a) that the incoming message is fresh, because it contains the random number chosen by the button reader 4, (b) that the message is, in fact, for it, and (c) the random number chosen by the monitoring system 50. The random number chosen by the monitoring system 50 is then encrypted and transmitted, with the button reader ID, tag ID and sequence number. Upon receipt of this message, the monitoring system 50 knows that the message is fresh, because it contains the random number chosen by the monitoring system 50, and the associated action is performed. Feedback from that action is then returned to the button reader 4, together with the button reader's random number, thus assuring the button reader 4 that the incoming feedback is fresh.

The invention claimed is:

1. A user interface system for allowing users to initiate events, the system comprising:
a plurality of markers each having a marker identity;
a plurality of portable readers each having a reader identity and arranged to read said marker identities from adjacent markers, and
at least one base station arranged to communicate with said readers in a wireless manner,
wherein at least one reader is provided with actuation means which when actuated by a user causes the reader identity of the reader and the marker identity of an adjacent marker to be transmitted by the reader to said base station, so as to cause, for at least one of said markers, said base station to initiate, directly or indirectly, an action which is at least partly determined by the reader identity of said reader;
wherein when actuated by a user the transmission from at least some readers also includes a sequence number, which is incremented or decremented for each transmission; and
wherein said sequence number is also included in a confirmation transmitted from the base station to the reader that the marker and reader identities have been received.

2. A system as claimed in claim 1, wherein said action is also determined by the identity of said adjacent marker.

3. A system as claimed in claim 1, wherein at least some of said readers are associated with different users, in order to allow said action to be customized for different users.

4. A system as claimed in claim 1, wherein at least one reader provided with said actuation means is also provided with reading means for reading the identity of an adjacent marker, and said reading means is arranged to operate in a low power mode until actuation of said actuation means, and to switch to an operational mode following actuation of said actuation means.

5. A system as claimed in claim 4, wherein said reading means returns to said low power state after reading the identity of an adjacent marker.

6. A system as claimed in claim 5, wherein said reading means returns to said low power state before transmission of said identity of an adjacent marker and the reader identity to a base station.

7. A system as claimed in claim 1, wherein some or all of said portable readers are provided without any screen for displaying information to the user.

8. A system as claimed in claim 1, wherein some or all of said portable readers have a maximum dimension which is not greater than 4, 6 or 8 cm.

9. A system as claimed in claim 1, wherein said action takes place in the vicinity of said adjacent marker.

10. A system as claimed in claim 1, wherein said action is carried out by a device which is not part of, and not physically connected to, said reader.

11. A system as claimed in claim 1, wherein said base station is arranged to transmit to at least one reader a confirmation that the marker and reader identities have been received.

12. A system as claimed in claim 11, wherein said confirmation includes information relating to said action.

13. A system as claimed in claim 11, wherein at least one reader is arranged to provide a perceivable indication of said confirmation to the user.

14. A system as claimed in claim 11, wherein said at least one reader remains connected to said base station, in a networking sense, only until said confirmation has been received, or shortly thereafter.

15. A system as claimed in claim 1, wherein transmissions between at least some readers and base stations include a checksum.

16. A system as claimed in claim 1, which further comprises a monitoring system to which the or each base station is connected, and which contains a database of actions corresponding to each pair of reader and marker identities.

17. A system as claimed in claim 16, wherein the monitoring system is a CORBA object running on a computer connected to the internet.

18. A system as claimed in claim 1, wherein actuation of a reader adjacent to two markers within a predetermined period of time causes one or more actions which result in an association being formed between two hardware devices associated with said two markers respectively.

19. A system as claimed claim 1, wherein actuation of a first reader adjacent a given marker prevents the successful actuation of a further reader adjacent the same marker for a predetermined period of time, or until a particular event has occurred.

20. A system as claimed in claim 19, wherein said particular event is a subsequent actuation of said first reader adjacent said given marker.

21. A system as claimed in claim 1, wherein the or each base station records the time of each reader transmission.

22. A system as claimed in claim 1, wherein transmissions between at least some readers and base stations are encrypted.

23. A system as claimed in claim 1, wherein at least one reader is provided with a miniaturized antenna in the form of a wound inductor, so that the range of the reader is about 1 cm or less.

24. A user interface system for allowing users to initiate events, the system comprising:

a plurality of markers each having a marker identity;

a plurality of portable readers each having a reader identity and arranged to read said marker identities from adjacent markers, and at least one base station arranged to communicate with said readers in a wireless manner, wherein at least one reader is provided with actuation means which when actuated by a user causes the reader identity of the reader and the marker identity of an adjacent marker to be transmitted by the reader to said base station, so as to cause, for at least one of said markers, said base station to initiate, directly or indirectly, an action which is at least partly determined by the reader identity of said reader;

further comprising a monitoring system to which the or each base station is connected, and which contains a database of actions corresponding to each pair of reader and marker identities; and wherein the monitoring system is a CORBA object running on a computer connected to the internet.

25. A user interface system for allowing users to initiate events, the system comprising:

a plurality of markers each having a marker identity;

a plurality of portable readers each having a reader identity and arranged to read said marker identities from adjacent markers, and at least one base station arranged to communicate with said readers in a wireless manner, wherein at least one reader is provided with actuation means which when actuated by a user causes the reader identity of the reader and the marker identity of an adjacent marker to be transmitted by the reader to said base station, so as to cause, for at least one of said markers, said base station to initiate, directly or indirectly, an action which is at least partly determined by the reader identity of said reader;

wherein actuation of a first reader adjacent a given marker prevents the successful actuation of a further reader adjacent the same marker for a predetermined period of time, or until a particular event has occurred; and wherein said particular event is a subsequent actuation of said first reader adjacent said given marker.

* * * * *